UNITED STATES PATENT OFFICE.

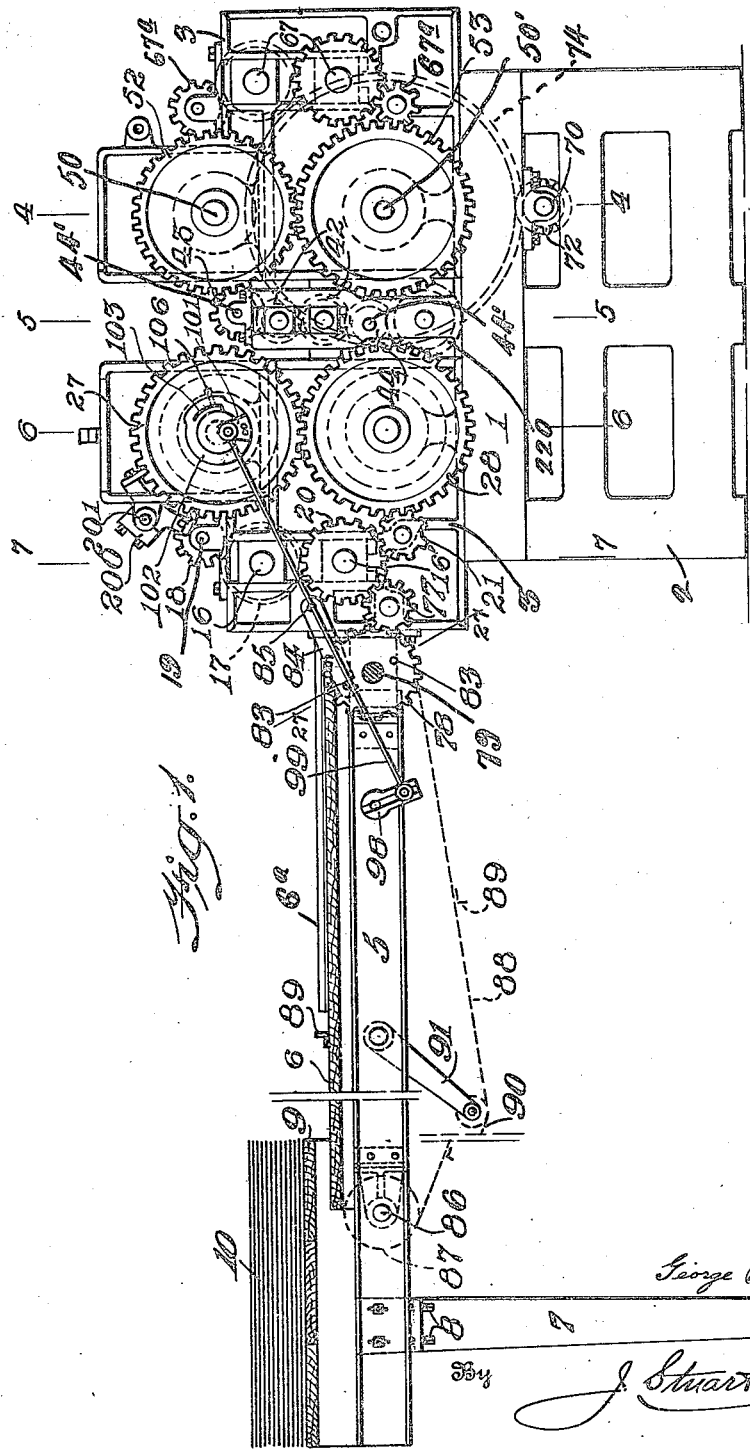

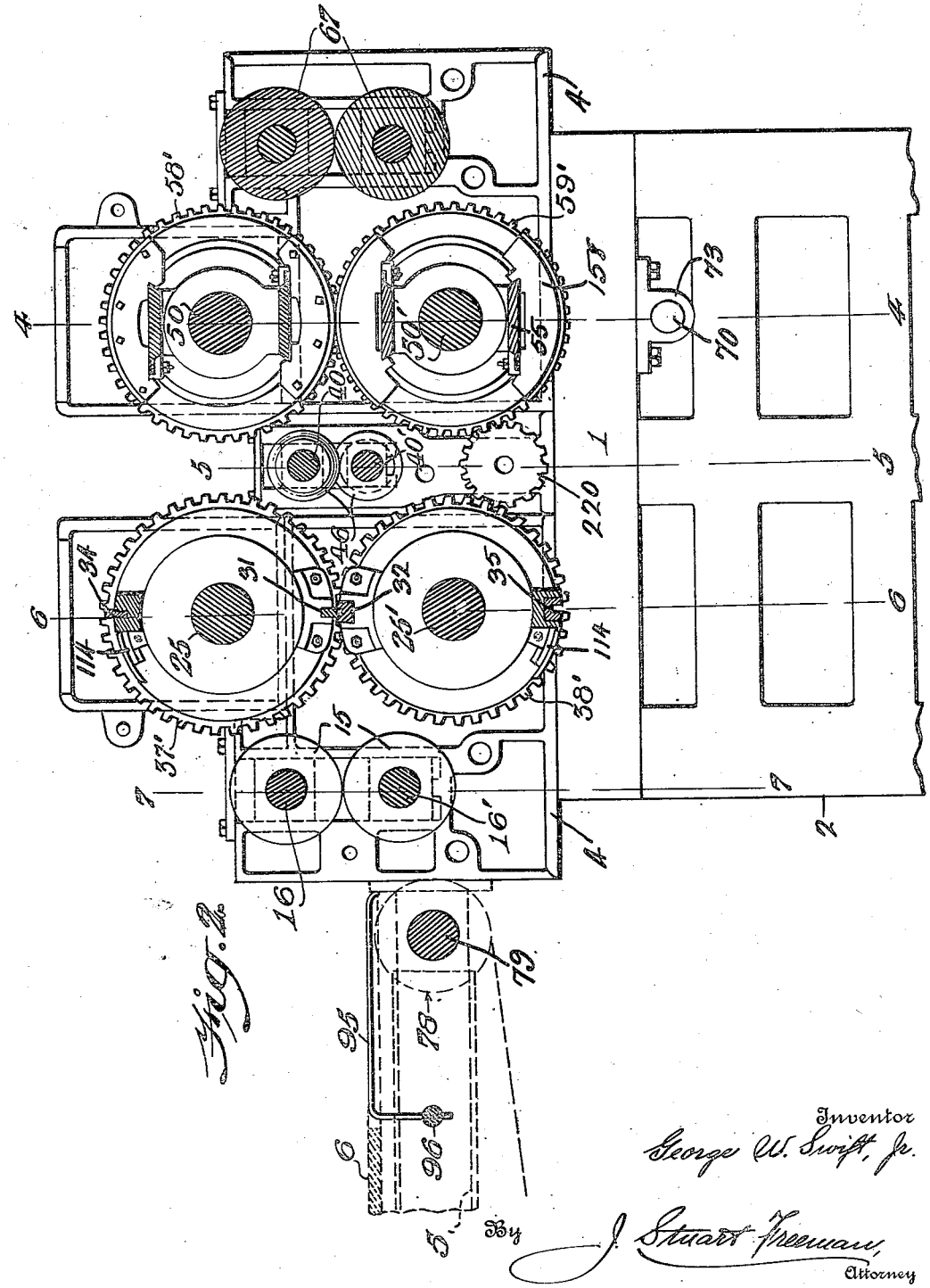

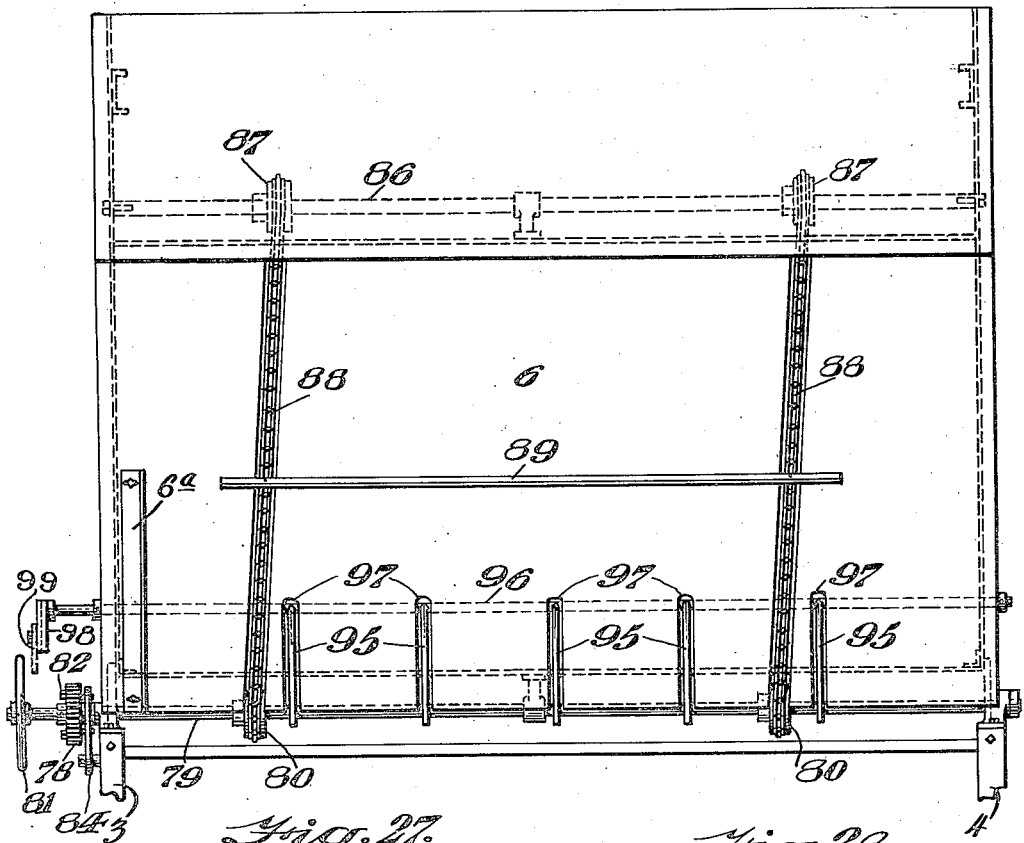
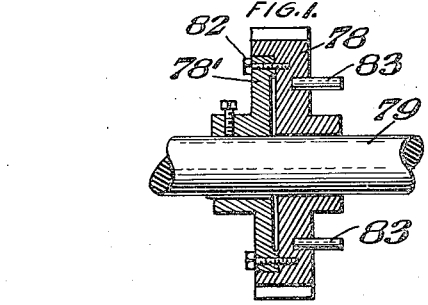
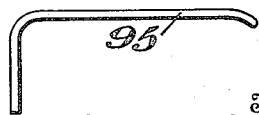

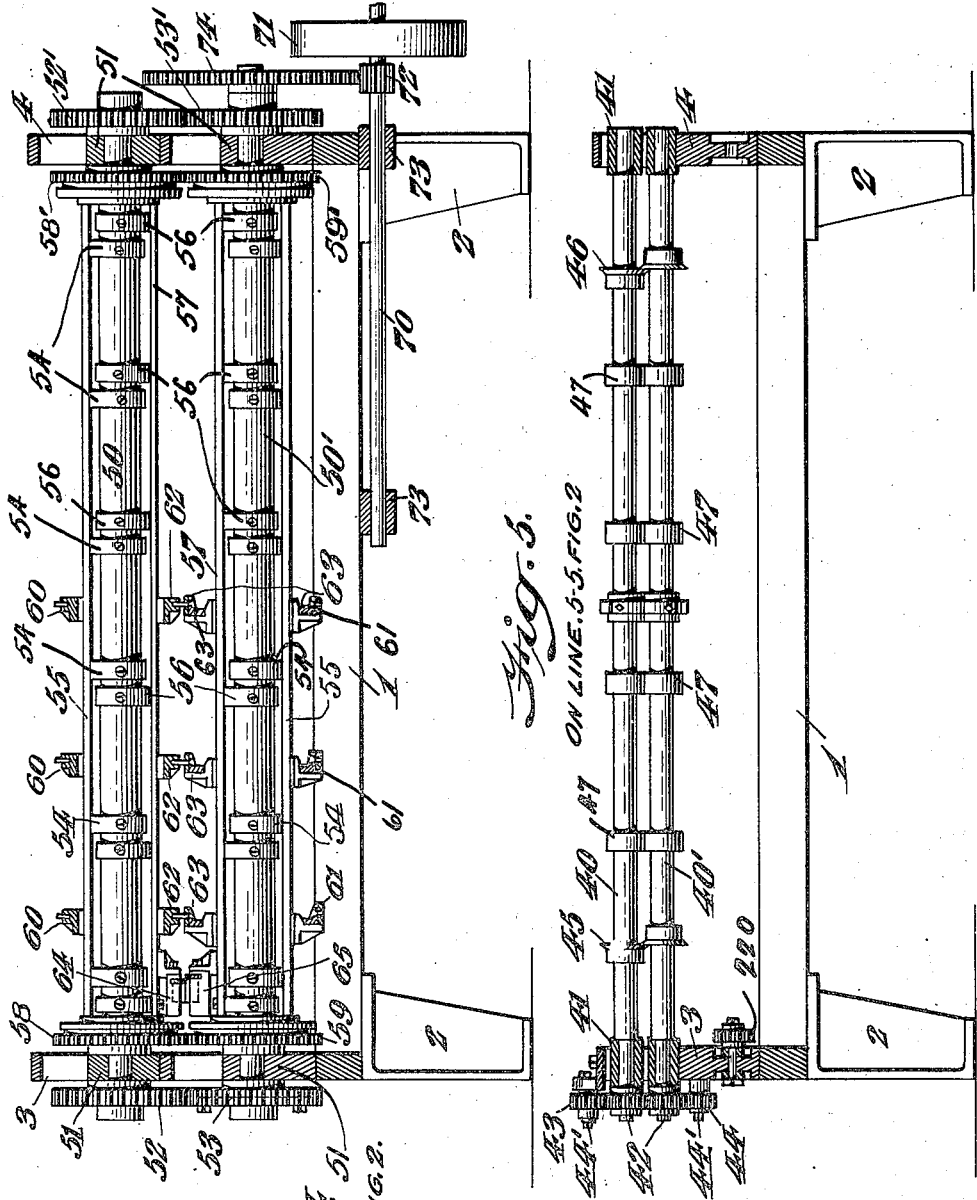

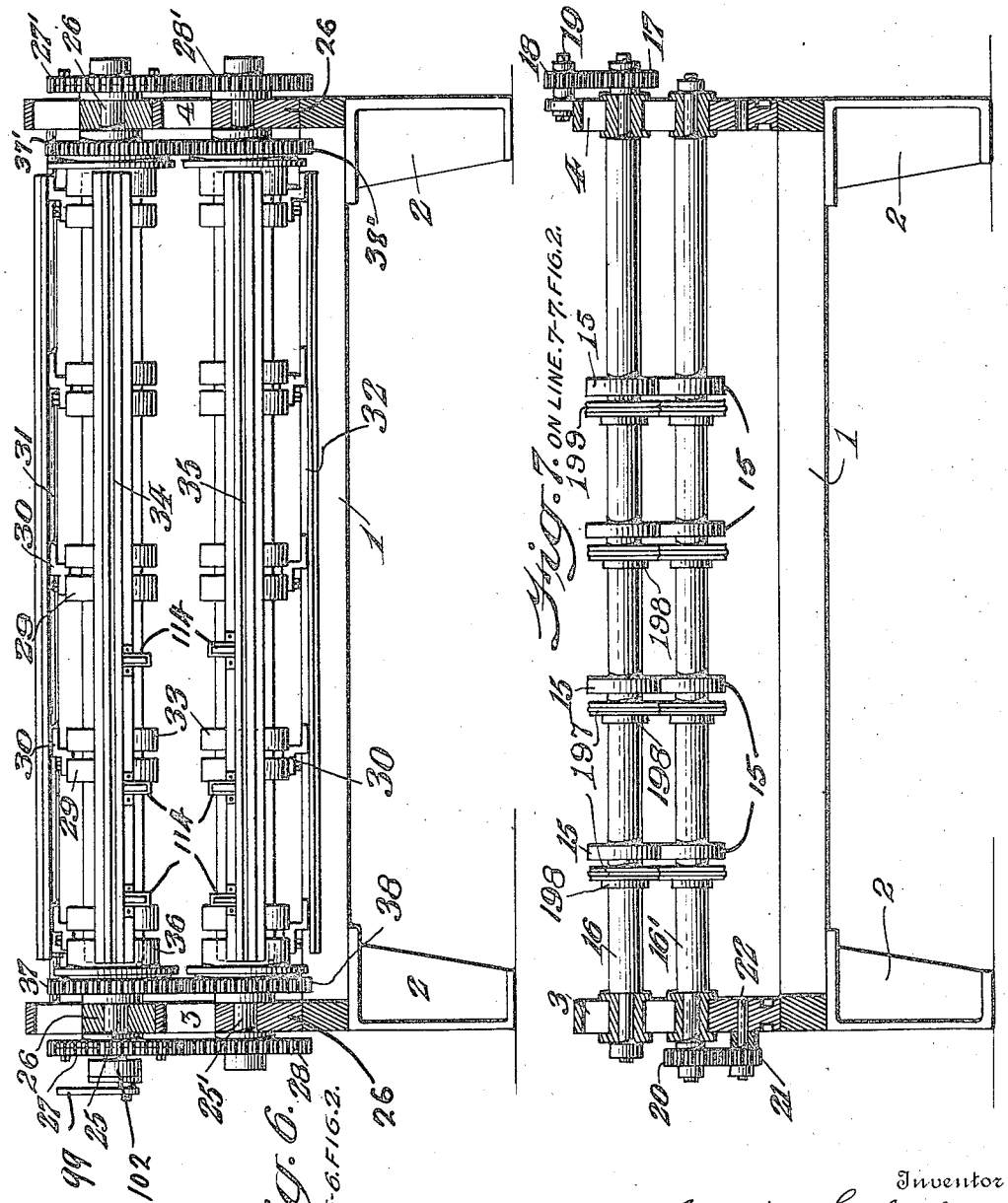

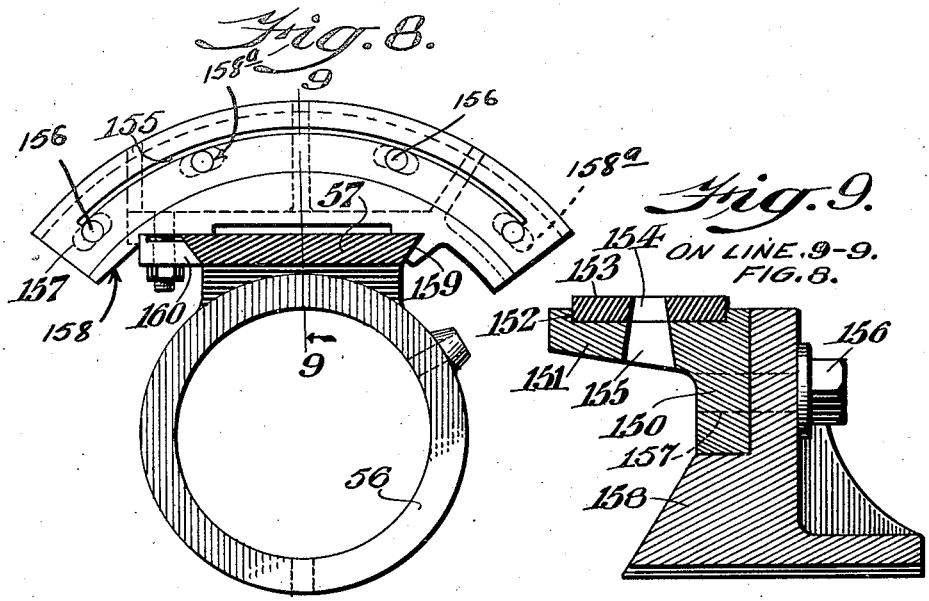
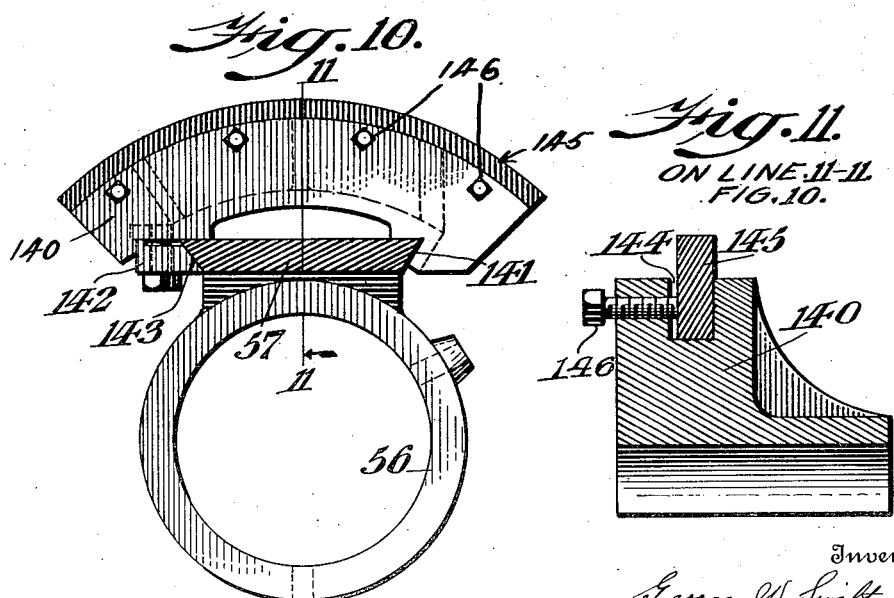

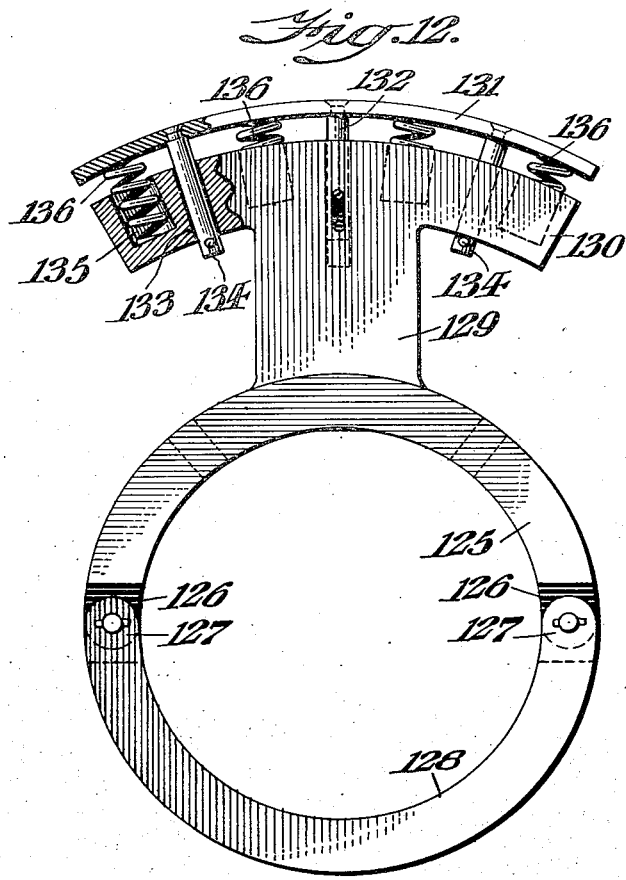
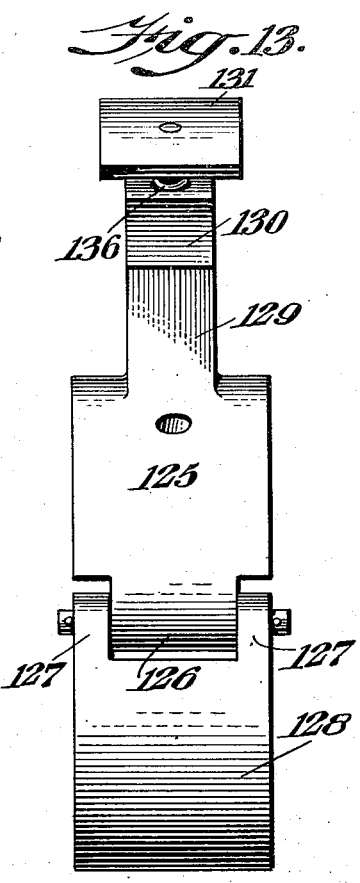
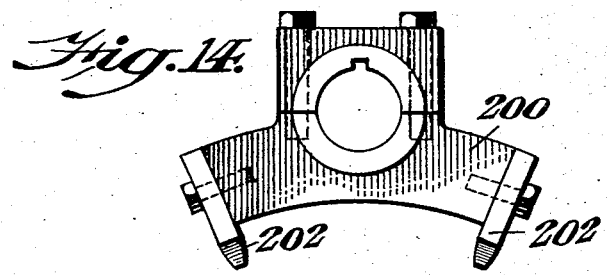
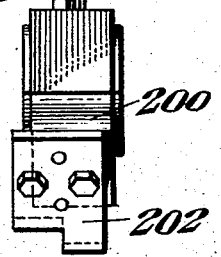

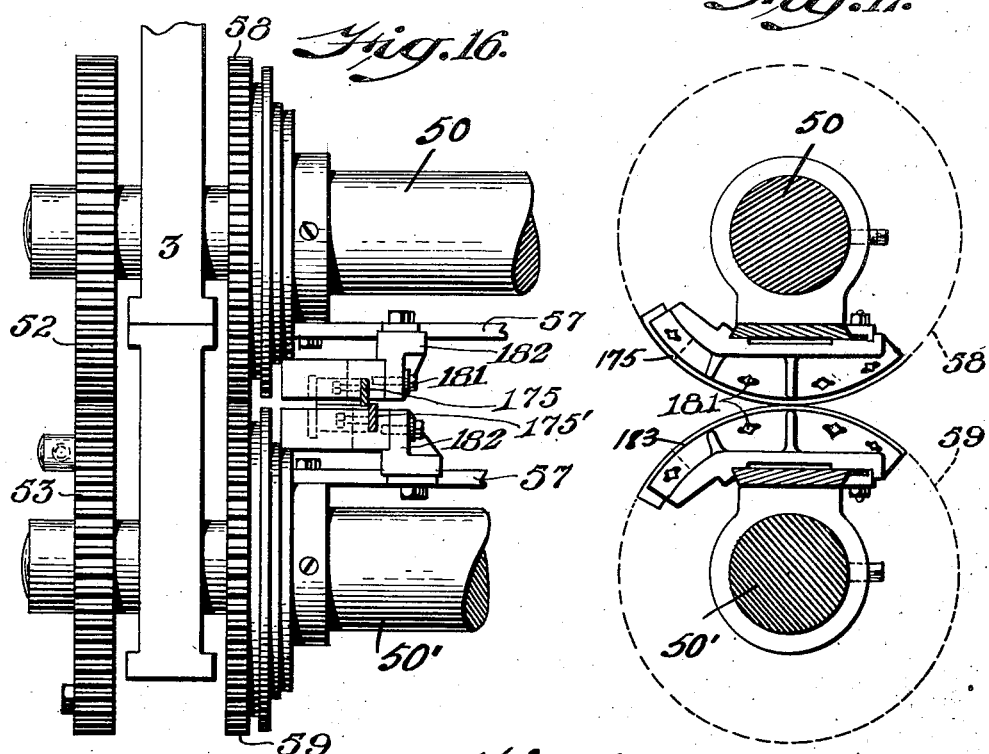

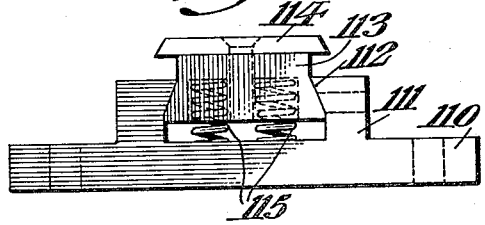
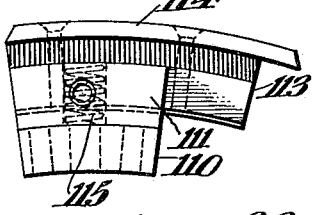
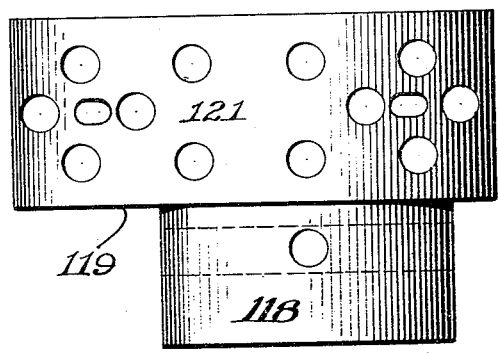
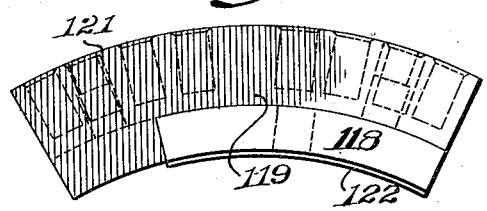
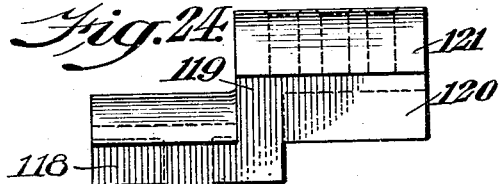
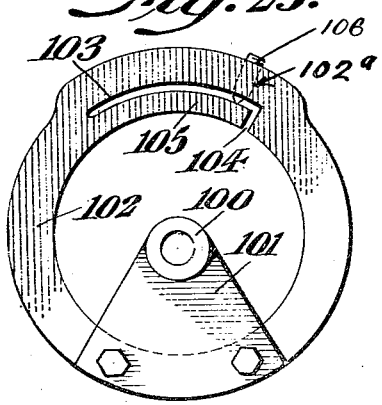
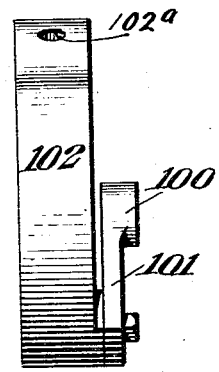

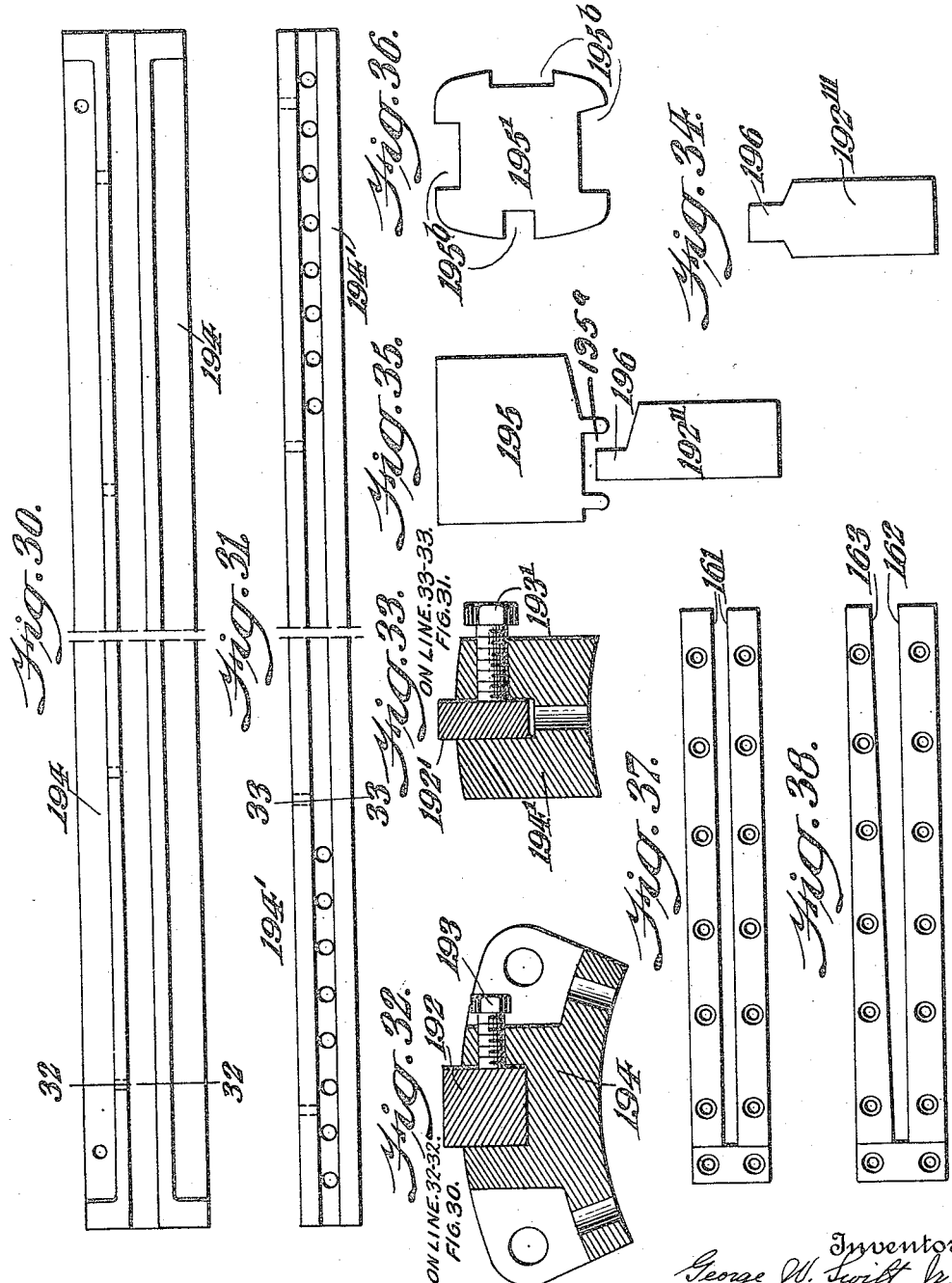

GEORGE W. SWIFT, JR., OF BORDENTOWN, NEW JERSEY.

CREASING AND SLOTTING MACHINE.

1,353,086.  Specification of Letters Patent.  Patented Sept. 14, 1920.

Application filed November 7, 1917, Serial No. 200,698. Renewed December 16, 1919. Serial No. 345,301.

*To all whom it may concern:*

Be it known that I, GEORGE W. SWIFT, Jr., a citizen of the United States, residing at Bordentown, in the county of Burlington and State of New Jersey, have invented certain new and useful Improvements in Creasing and Slotting Machines, of which the following is a specification.

The object of this invention is to provide a machine which will most efficiently slot and crease material, such as card board or corrugated board, for the formation of boxes, cartons, or containers, therefrom.

More specifically the object is to provide an improved combination and correlation of creasing, scoring, slotting and trimming mechanisms within one machine; to provide improved self-cleansing slotting dies; to provide an improved feed table mechanism; to provide an improved mechanism for adjusting the correlation of the respective creasing, scoring and slotting devices to make different sizes of boxes; to provide improved corner-cutting dies; to provide improved yielding-surface feed segments; and to provide other objects and improved details in the construction and operation of the preferred embodiment of the invention as hereinafter described.

Figure 39:
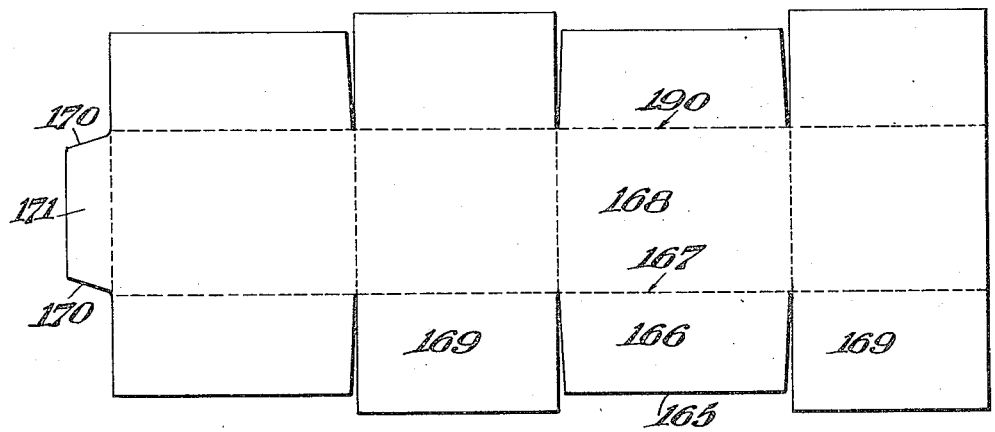
Figure 40:
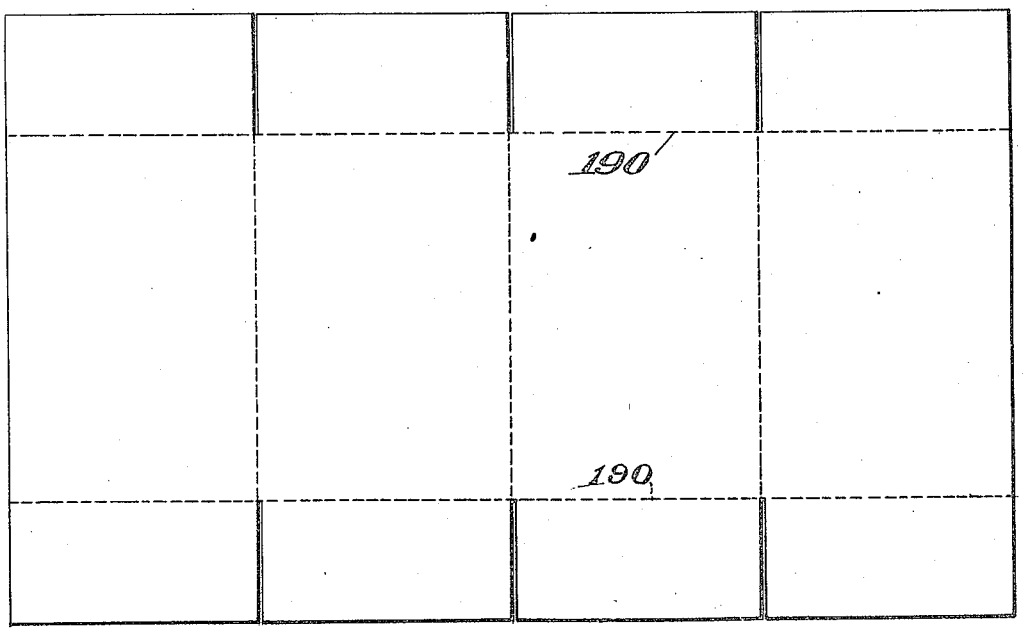

In the drawings forming a part of this application Figure 1 is a side elevation of a successfully demonstrated embodiment of the invention; Fig. 2 is an enlarged central vertical section of major part of same from front to rear; Fig. 3 is a plan view of the feed table; Fig. 4 is a vertical section on the line 4—4 of Fig. 2; Fig. 5 is a similar section on the line 5—5 of Fig. 2; Fig. 6 is a similar section on the line 6—6 of Fig. 2, the adjustable male and female creasing members being shown in shifted positions; Fig. 7 is a similar section on the line 7—7 of Fig. 2; Fig. 8 is a side elevation of one of the slotting dies. Fig. 9 is an enlarged section on the line 9—9 of Fig. 8; Fig. 10 is a side elevation of one of the slotting punches; Fig. 11 is an enlarged section on the line 11—11 of Fig. 10; Fig. 12 is a side elevation of one of the feeder segments; Fig. 13 is an end view of the same; Fig. 14 is a side elevation of the gear locking member; Fig. 15 is an end view of the same; Fig. 16 is a fragmentary view of the corner cutting mechanism, operating gears, etc.; Fig. 17 is a vertical transverse section of the same; Fig. 18 is a plan development of the first pair of the corner cutting dies and cutters; Fig. 18ª comprises two related sectional views, one showing the coöperation of the flap-cutting knives 175 and 183, while the other shows the coöperation of the knife 177 with the bar 185; Fig. 19 is a view similar to Fig. 18 of the second pair of said dies and cutters; Fig. 20 is an end view of one of the segmental feed rolls; Fig. 21 is a side elevation of the same; Fig. 22, 23 and 24 are respectively top, side and end views of the feeder rolls for the creaser shaft; Figs. 25 and 26 are respectively side and end views of an improved adjustable crank or eccentric for the feed table stock elevating arms; Fig. 27 is a section on line 27—27 of Fig. 1; Fig. 28 is a side view of the locking member for the feed table mechanism; Fig. 29 is a similar view of one of the feed table stock elevating arms; Figs. 30 and 31 are plan views of holders for transverse creaser bars; Figs. 32 and 33 are transverse sections through the same, showing creaser bars positioned therein; Fig. 34 is an end view of one of the creasing bars used; Fig. 35 is an end view of a similar bar in coöperation with one of the corresponding female creasing bars; Fig. 36 is an end view of a female creasing bar providing for a plurality of papers of different thicknesses; Figs. 37 and 38 are plan views of respectively straight and tapered dies for cutting the slots; Figs. 39 and 40 are plan views of two shapes of blanks cut by the improved machine and from which boxes or cartons are made.

Referring to the drawings the preferred embodiment of the invention comprises a horizontal bed plate 1, supported by spaced legs or brackets 2 and at its latterly opposite ends supporting side frames 3 and 4, while from the forward portion thereof extends a horizontal feed table comprising spaced channel irons, 5 between the upper surfaces of which extends the plate 6 forming the table surface, while the said table is suitably supported by legs 7, adjustably secured thereto by means of bolts 8. Above the forwardmost portion of the said table surface is an elevated shelf 9, upon which corrugated board or other blanks 10 are piled, from which position they are designed to be fed into the machine as will now be described.

Suitably journaled in the channel iron side bars 5 adjacent to the front and rear ends of feed table 6 are the transverse shafts 79 and 86 carrying respectively the spaced sprocket wheels 80, 80 and 87, 87 upon which are mounted the endless parallel sprocket chains 88 connected by the angle-iron feed bars 89. (See Figs. 1 and 3.) The sprocket wheels 80, 80 are slightly out of longitudinal alinement with the sprocket wheels 87, 87 to cause the connected sprocket chains 88 to travel in the laterally inclined slots formed in the table 6 to receive the chains. An adjustable angle-iron side gage 6ª is mounted upon the feed table 6 at the side toward which the sprocket chains 88 incline, so that the feed bars 89, moving in their inclined path, continually urge the successive blanks into gaging contact with gage 6ª and insure the feed of the blanks to the machine in proper position. The tension of the sprocket chains 88 may be maintained as desired by means of idlers 90, carried upon the free ends of depending pivotally mounted members 91.

The blank-feeding mechanism just described is suitably geared to the slotting and creasing machine to permit the convenient adjustment and timing of the feed to correspond with the work to be performed. I prefer to accomplish this result by the mechanism shown particularly in Figs. 1, 3, 27 and 28 of the drawings in which a gear wheel 78 is adjustably mounted upon shaft 79 by means of a disk 78' which is fast upon the shaft and is detachably secured to gear 78 by means of screw bolts 82. Pins 83 project laterally from gear 78 (at diametrically opposite points) in position to be engaged by a latch member 84 pivotally mounted at 85 upon the frame 3 by which the gear is held against movement when freed from the shaft 79. Gear 78 meshes with and is driven by an idler pinion 77, which is in turn driven by a pinion 20 on shaft 16' hereinafter referred to. The shaft 79 also has a hand-wheel 81 secured to it, by which the feed mechanism can be manually adjusted when the gear 78 is freed on shaft 79.

In adjusting the feed mechanism for a given size of box blank the machine is stopped with the first pair of creasing members (presently to be described) in a given position, such for instance as that shown in Fig. 2, and the latch member 84, is moved into engagement with one of the pins 83, carried by the gear 78. Said gear is then freed from its shaft 79 by unscrewing bolts 82, as described and shaft 79 is revolved by means of the hand-wheel 81, until a feed bar 89, abuts against the rearmost edge of the desired blank resting upon the table 6 and having its forward edge in the desired relationship with said first set of creasing members. The screw-bolts 82 are then tightened to lock the gear 78 upon its shaft, and latch member 84 disengaged from pin 83, after which each successive blank will be fed into the machine in exactly the desired position. This feeding mechanism is covered by my divisional application Serial No. 277,550, filed February 17th, 1919.

Successive blanks are taken from the shelf 9 and placed upon feed table 6 over which they are carried by the feeding mechanism above described and presented to feed rolls 15 carried by transverse shafts 16, 16' (see Fig. 7). Said shafts are journaled in side frames 3 and 4, the upper of said shafts 16 carrying a pinion 17, at one end meshing with an idler pinion 18, substantially above it and rotatably carried by a pin 19 secured to the frame 4, while the lower of said shafts 16' has secured thereto the pinion 20, meshing in turn with an idler pinion 21, revolubly carried by a pin 22, secured to the frame 3.

As each blank approaches the feed rolls 15 its forward edge is raised by the spaced arms 95 mounted upon the rock shaft 96 and movable upwardly through spaced slots 97 in the feed table 6. The outer end of the shaft 96 carries a slotted crank-arm 98 to which is adjustably journaled one end of a rod or pitman 99 having its other end journaled upon an operating crank mounted upon a suitably timed shaft of the machine. I prefer to construct this operating crank in the form shown in Figs. 1, 25 and 26, in which a segmental crank-arm 101, having a crank-pin-opening 100, is securely bolted to one edge of the outer face of a removable and adjustable ring or collar 102, which is radially enlarged upon the side opposite arm 101 and suitably slotted, as at 103, 104, to form an integral spring tongue 105, which constitutes part of the wall of the circular bore or opening of the ring or collar that fits the outer end of one of the machine shafts such as shaft 25. The enlarged portion of the ring or collar 102, is formed with a threaded radial opening 102ª adjacent to the free end of the spring tongue 105 to receive a screw bolt 106, which is adapted to engage tongue 105 and firmly clamp it against the surface of the shaft 25 for securing the ring or collar in the desired adjusted position thereon. The segmental arm 101 is so proportioned with reference to the diameter of the ring or collar 102 that the crank-pin-opening 100 will be eccentric to the shaft 25 with the result that the rotation of shaft 25 will intermittently raise and lower the arms 95 for the purpose explained.

The blanks pass from feed rolls 15 to the creasing members mounted upon the vertically spaced shafts 25, 25' journaled in bearings 26 carried by side frames 3 and 4. These shafts 25, 25' are provided with two sets of intermeshing gears, one set secured to the shafts outside of the frames 3 and 4 and made up of gears 27, 27' on shaft 25 and gears 28, 28' on shaft 25', while the other set is secured to the shafts inside of the side frames 3 and 4 and comprises gears 37, 37' upon the shaft 25 and the gears 38, 38' upon the shaft 25'. The intermeshing gears outside of the side frames are normally fixed upon their shafts, although it is preferred to provide means by which they can be relatively adjusted. The intermeshing gears inside of the side frames are adjustably mounted upon the respective shafts for the purpose which will presently appear.

The shafts 25, 25' are also provided with series of spaced wheels or collars indicated at 29 and 33 for supporting two pairs of relatively adjustable male and female creasing members, which are preferably in the form of suitably shaped rigid bars. One pair of said creasing members, indicated at 31 and 32, is carried by suitable brackets 30 secured to and supported by the wheels or pulleys 29 and 33. The creasing members of the other pair, indicated at 34 and 35, are secured at their opposite ends to suitable flanges or pulleys 36, which are rigidly attached to the inner intermeshing gears 37, 37' and 38, 38', which are so mounted upon the shafts 25, 25' that they may be freed or loosened thereon to permit their supporting shafts to independently rotate in said gears when the gears and their attached creasing members are held against motion. Upon the bar 201 extending across the machine and supported in brackets upon the side frames 3 and 4 are mounted adjustable gear locking members 200, one of which is shown in detail in Figs. 14, 15 of the drawings. Each of these locking members is adjustably keyed upon its supporting bar and provided with two inwardly presented gear-engaging teeth 202. These locking members 200 can be moved longitudinally upon their supporting bar so as to intermesh with the teeth of gears 37, 37' to hold said gears and the gears 38, 38' against movement when the gears and connected creasing members are loosened upon their shafts. With the intermeshing gears so locked against motion, the shafts carrying the fixed pair of creasing bars are rotated in the desired direction to change the circumferential distance between the fixed and adjustable pairs of creasing members to suit the desired size of box blanks that are to be made. When the desired adjustment has been effected, the inner set of intermeshing gears 37, 37' and 38, 38', with their attached creasing members are again securely fastened to their respective shafts and the locking members 200 moved out of engagement with the gears 37, 37', when said properly adjusted pairs of creasing members will be ready to coöperate in the production of box blanks of the desired size. Suitable provision is made for fastening locking members 200 upon bar 201 in either of their engaged or disengaged positions.

Continuing onward the board, which is in the process of formation into a box blank, passes between two vertically spaced horizontally positioned shafts 40 and 40' journaled at their opposite ends through bearings 41, carried by the respective frames 3 and 4 of the machine, said shafts each carrying at their adjacent ends interlocking gears 42, which latter mesh in turn with gears 43 and 44 rotatably journaled on pins 44' on side frame 3 and respectively above and below said first-mentioned gears. These shafts have secured thereto pairs of longitudinally adjustable rotary trimming knives 45 and 46 for cutting to the desired length the board as it passes therebetween, said shafts also being provided with spaced pairs of feed rolls 47, for insuring a continued and uninterrupted passage of the said blanks.

Still further as the blank continues through the machine, it passes between a pair of vertically spaced, parallel, horizontally extending shafts 50 and 50' journaled through bearings 51 in the respective frames 3 and 4 of the machine and carrying upon their outermost end portions and outside of the said frames constantly interlocking gears 52—52' and 53—53', respectively while between the said frames the said shafts carry spaced pairs of collars 54, secured thereto and in turn carrying plane bars 55, provided upon their latterly opposite sides with radially inwardly converging surfaces to provide a dove-tail cross-section (as shown in Figs. 8 and 10). Further surrounding the said shafts 50 and 50' are spaced pairs of collars 56, to which are secured plane bars 57, of dove-tail cross-section like the bars 55 above described, the opposite end portions of said bars 57 being secured indirectly to constantly interlocking pinions 58—58' and 59—59', respectively, mounted upon shafts 50, 50' inside the side frames 3 and 4. These gears 59, 59' upon shaft 50' are geared respectively to the gears 38, 38' upon shaft 25' by means of intermediate pinions 220 journaled upon stud shafts on inner sides of frames 3 and 4. By this gearing the inner sets of gears 37, 37', 38, 38' and 58, 58', 59, 59' will always act in unison and be held against motion when locked by member 200.

The two bars 55 carry inter-engaging dies 60 and 61 as hereinafter described, while the said bars 57 also carry spaced pairs of coöperating dies 62 and 63, which latter can be shifted circumferentially about their respective shafts by temporarily loosening the set screws or bolts which normally secure the respective collars to said shafts in fixed position, thus by said adjustment adapting the machine to form blanks for various sizes of boxes. For the purpose of forming blanks such as that shown in Fig. 39 a set of dies 64 and 65 (Fig. 4) are secured to the bars 57 at the end portions adjacent to the frame 3 and of a construction hereinafter described. From between the last-named pair of shafts the blank passes onward between a pair of rolls 67, which operate to remove said blank from the dies between which it has just passed, and to deliver it to a platform or the like as may be desired.

For driving the various elements of this machine there is provided a counter shaft 70, preferably carrying a belt pulley 71 and a pinion 72, said shaft being journaled through spaced bearings or brackets 73, depending from the under side of the bed plate 1. The pinion 72 meshes with a gear 74, secured to the shaft 50' which by means of the interlocking gears 52—52' and 53—53' rotates shaft 50. The gear 52 meshes with the pinion 43 which by means of the coöperating pinion 42 also drives pinion 44 which latter meshes directly with the gear 28, coöperating with gear 27. Also meshing with gear 28, is the pinion 21 which turns the pinion 20 of the shaft 16' while meshing with the gear 27' is the pinion 18, which also coöperates with the pinion 17, of the shaft 16. The rolls 67 are driven by idler pinions 67ª intermeshing with gears 52 and 53.

Referring to Figs. 20 and 21, an automatically adjustable feed roll segment is shown in detail, the position of the same within the machine being shown clearly in Fig. 2 immediately adjacent to the upper and lowermost creasing members carried by the shafts 25 and 25'. This roll segment essentially comprises a plate 110, which is normally secured to the collars 29, carried by the said shafts, and which is provided with integral outwardly extending lugs 111, having converging adjacent faces 112 between which is adapted to be seated a member 113, carrying a surface plate 114 having an exposed surface formed upon an arc about the center of the shaft upon which it is mounted, said member being yieldingly maintained in its outermost position by coil springs 115, adapted to permit said member in operation to provide for the use of various thicknesses of paper, cardboard, corrugated board, or the like, in the manufacture of box blanks.

In Figs. 22, 23 and 24 is shown in detail another form of segmental feed roll comprising a body portion 118 provided with a radially extending flange 119 from which projects laterally an integral shoulder 120 in turn provided with a radially outer face 121 formed upon an arc about the center of the shaft upon which said roll is mounted, the said body portion being provided upon its radially inner surface with a longitudinally extending raised portion 122 for the purpose of assisting in correct position of the member as a whole in the machine.

Figs. 12 and 13 show in detail one feed member of a set of coöperating segmental pairs thereof for insuring a positive feed of the box material through the machine and it is to be noted that while one of the members of each pair is mounted upon each of the shafts 25 and 50 and constructed as shown, the other is mounted upon each of the shafts 25' and 50' and is substantially the same except for the fact that its feed surface is an integral part of its body and is not adapted to yield from its normal position as material of various thicknesses comes into contact therewith. The members shown comprise a semi-circular yoke portion 125, having apertured reduced end portions 126 fitting between and pinned to the lugs 127 of the bifurcated ends of a second semi-circular yoke member 128. Extending radially from the central portion of the member 125 and integral therewith is an arm 129 provided with an enlarged head portion 130, adjacent to which is positioned in parallel relation therewith a segmental feed plate 131. Said plate is provided with inwardly extending pins 132 adapted to pass slidably through relatively larger radially extending apertures 133 in the head 130, said pins being prevented from more than predetermined movement by the pins 134 extending transversely through the inner end portions thereof. The head portion 130 is also provided with enlarged recesses 135 extending inwardly from its outer surface and adapted to form cups for the retention of coil springs 136, which at their outer free ends press against the inner surface of the feed plate 131 and tend to maintain the same yielding in its outermost position. These segmental feed-members are used only when working upon sheets which are too narrow to reach from the shafts 16—16' to the shafts 40—40'.

The rotary punches and dies carried by the shafts 50 and 50' are shown in detail in Figs. 8 to 11 inclusive. As hereinbefore described said shafts are encircled by collars 56 having secured thereto longitudinally extending dove-tailed bars 57, while adjustably mounted upon the latter are the supporting members for the punches and dies on the shaft 50', each of the punch supporting members 140 has a beveled surface 141 adapted to coöperate with one edge portion of said bar and is provided also with an adjustable member 142 having a beveled surface 143 adapted to adjustably grip the edge portion of said bar. The outermost surface of the member 140 is provided with a radially inwardly extending longitudinal recess 144, in which is adjustably positioned a ground segmental punch member 145 by means of set screws 146.

Positioned upon the shaft 50 and exactly in alinement with the punch and mounting just described, is a corresponding die and its mounting. Specifically this latter comprises a segmental die supporting member 158 formed with suitable integral strengthening ribs on one lateral face and a curved shouldered recess in its other lateral face to receive a circumferentially adjustable member 150 having a transversely extending portion 151 recessed upon its outer surface 152 and adapted to receive a ground die plate 153, having a longitudinally extending aperture 154, the sides of which taper radially outwardly and lie substantially in planes with the corresponding sides of a similarly extending aperture 155, in the portion 151. Die plate 153 is secured in the recessed face 152 by suitable means, not illustrated. Plate 153 is omitted from Fig. 8. The box blank shown in Fig. 39 illustrates the shape of slits cut by punches 145 and dies 153, while the shape of a box blank formed by the sole use of such dies as that shown in Fig. 37 is shown in detail in Fig. 40. Each of the members 150 is adjustably secured by means of a bolt 156, passing slidably through elongated apertures 157, to a member 158, which in turn is provided with a diagonally disposed surface 159, adapted to coöperate with one side of the dovetailed bar 57 carried by the collar 56, while the opposite side of said bar is held by a member 160, secured by a bolt to the member 158.

For forming the cut-out portions 170 shown at one end of Fig. 39 and adapted thereby to create a tapered tongue 171, flap dies and punches are provided such as are shown in plan detail in Figs. 16 to 19 inclusive. The punch and die pair shown in Fig. 18 is adapted to form the first of the two cut-out portions as the box material passes through the machine, while the punch and die pair of Fig. 19 forms the second of said portions. The said pairs are similar in construction and operation and the punch of each comprises a shearing bar 175, having a cutting edge 176, while said bar is curved outwardly at 177 and provided with the flap cutting edge 179, said bar also being removably secured within angularly related slots 178 within the radially outer surface of a base member 180 secured by bolts 181 to a member 182 in turn removably and adjustably secured to the dove-tailed bars 57, carried indirectly by the shafts 50 and 50'.

The corresponding die for the shearing and cutting punch just described comprises a bar 183, provided with a shearing edge 184, said bar terminating adjacent to an angularly extending bar 185, against the radially outer surface of which when in operative position the cutting edge 179 of the said punch coöperates in alinement with the similar arc 186, corresponding with the curved portion 187 of the punch shearing edge 186. With this construction, as the respective dies and punches come together in rolling contact in the direction of the arrows, the circumferential cutting of the box blank is effected by means of a shearing cut, while the converging sides of the tongue portion of the said blank are cut similarly by pressure of a cutting edge against a relatively smooth surface as in the case of a chisel. The operation of the oppositely disposed pair of flap cutting dies and punches is shown in a similar manner by Fig. 19 wherein the same numerals are used as in Fig. 18 except that each is primed. Thus, while the laterally adjacent edges 176 and 184 of the knives 175 and 183, respectively, coöperate to shear the paper board by a rotary motion, on the other hand, the chisel-like cutting edge 179 of the knife 177 coöperates with the flat radially outer surface of the bar 185, and in alinement with the adjacent portion of the arc indicated at 186, said arc marking the point at which the cut and sheared portions of the edges of the card-board-flaps of a box-blank unite.

In forming the transverse creases 190 in the box blanks male and female creasing members are used such as for instance those shown in detail in Figs. 30 to 36 inclusive. Therein a male creasing member 192 (or 192' or 192'' or 192''') is rigidly yet removably held by adjustable means 193 and 193' in a suitable mounting 194 secured in turn in any suitable manner upon the shafts 25 and 25' and one of the pairs being immediately to the rear of the feed members shown in Figs. 20 and 21. Corresponding and coöperating with the said male creasing members are positioned female creasing members 195 (or 195') provided with longitudinally extending slots 195$^a$ of various widths as shown in Figs. 35 and 36, the latter being a bar having slots of four distinct widths 195$^b$, which upon having the box material forced thereinto by the working portions 196 of said male members, such as those shown in Figs. 34 and 35, forms the creases 190, upon which lines the blank may be folded to ultimately form a box.

The longitudinal creases in the blank are preferably rolled in by means of rolls 197, secured by means of collars 198 to the shafts 16 and 16' (Fig. 7) and adjacent to the feed rolls 15 hereinbefore described in detail. The radially outer surfaces 199 of said creasing rolls are corrugated and coöperate in such manner that the ridges of each force the paper into the grooves of the other of each pair, this form of crease having been found to be much better than those wherein a single male member rolls the paper into a female member.

When it is desired to set the machine to cut out blanks of a definite size, the locking members 200 are shifted upon their shaft 201 to engage the teeth of gears 37, 37' to firmly hold them against rotation upon the shaft 25. Since these gears are in intermeshing trains with the gears 38, 38', 58, 58' and 59, 59', as hereinbefore described, this entire system of gears upon shafts 25, 25' and 50, 50' will be held against motion. The enumerated gears and the creasing bars, punches and dies, which are connected to them as hereinbefore described, are then freed upon their shafts by loosening up the set screws that normally secure them in position. The intermeshing system of gears 27, 27', 28, 28', 52, 52' and 53, 53' fastened to the shafts 25, 25' and 50, 50' outside of the side frames of the machine, as well as the other pairs of creasing bars, punches and dies that are fast upon said shafts, are then rotated, by hand or by power, forwardly or backwardly, to circumferentially adjust the distances between the several pairs of creasing bars, punches and dies. It will be understood that those members that are fast upon the shafts will move with the shafts while the members that were loosened or disengaged from the shafts will be held against motion during this adjustment. When the desired adjusted relationship is obtained, the inner system of intermeshing gears together with the creasing bars, punches and dies connected with them are again made fast upon their shafts and the locking members 200 shifted out of engagement with the controlling gears, when the machine will be in readiness for operation. This mechanism provides a convenient and effective means for quickly and accurately adjusting the machine from one size of box blank to another. The systems of gears permits the quick adjustment between the several pairs of punches, dies, etc., without interfering with the set relation of the individual members of the pairs or groups. This mechanism constitutes a very important feature of the improved machine. The longitudinal positions of the punches and dies, as well as the shearing wheels 45 and 46, may be adjusted upon their respective shafts by loosening the bolts which hold them in normally fixed position.

The expression "blank forming members" used in some of the claims is intended to cover broadly any of the various forms of devices that act upon the blanks, such as the creasing, slotting or trimming members, which are variously referred to in this art as creasers, punches, dies, trimmers, etc.

Having thus described my invention, what I claim and desire to protect by Letters Patent of the United States is:—

1. In a machine of the class described, flap-cutters comprising coöperating members, an edge of one of said members coöperating in shearing engagement with the corresponding portion of the other of said members, and another portion of said first member being provided with an edge which coöperates with a facial surface of the corresponding portion of said second member.

2. In a machine of the class described, flap cutters comprising, L-shaped members, one leg of one coöperating in shearing engagement with the corresponding leg of the other, and the second leg of the first being provided with a cutting edge adapted to coöperate with the adjacent facial surface of the corresponding leg of the second member.

3. In a machine of the class described, the combination of a die holder, comprising a body portion having a radially outwardly extending flange, and a segment comprising a body portion adapted to be secured to said flange, and a laterally projecting flange on said segment provided in turn with a recess, and a die adapted to be secured in said recess.

4. In a machine of the class described, the combination of a die holder, comprising a body portion having a radially outwardly extending flange, and a segment comprising a body portion adapted to be secured to said flange, and a laterally projecting flange on said segment provided with a radially extending aperture and a recess upon its radially outwardly extending surface, and a die adapted to be secured in said recess and provided with an aperture in alinement with said first aperture.

5. In a machine of the class described the combination of a pair of shafts, interlocking means operative to maintain said shafts in constant angular relation, a male punch and a female die secured to said respective shafts, a second punch and die pair movable about said shafts, means to normally secure said second pair to revolve with said shafts, and interlocking means operative to maintain said latter punch and die pair in constant angular relation.

6. In a machine of the class described, the combination of a pair of shafts, interlocking gears carried by said shafts and operative to maintain said shafts in constant angular relation, a male punch and a female die secured to said respective shafts, a second punch and die pair movable about said shafts, and interlocking gears connected to said second punch and die pair and operative to maintain them in constant angular relation.

7. In a machine of the class described, the combination of a pair of shafts, interlocking means operative to maintain said shafts in constant angular relation, a set of transverse creasing bars secured to said shafts, a second set of transverse creasing bars movable about said shafts, and interlocking means operative to maintain said second set of creasing bars in constant angular relation.

8. In a machine of the class described, the combination of a pair of shafts, interlocking means operative to maintain said shafts in constant angular relation, a set of transverse creasing bars secured to said shafts, a second set of transverse creasing bars movable about said shafts, means to normally secure said second set of creasing bars to their respective shafts, and interlocking means operative to maintain said second set of creasing bars in constant angular relation.

9. In a machine of the character described, the combination of a pair of shafts, interlocking means maintaining said shafts in constant angular relation, two pairs of coöperating blank forming members mounted upon said shafts, secondary interlocking means connected with one pair of said members and maintaining its operative angular relationship, and releasable means securing said secondary interlocking means and connected members to said shafts.

10. In a machine of the character described, the combination of a pair of shafts, interlocking means maintaining said shafts in constant angular relation, two pairs of coöperating blank forming members mounted upon said shafts, secondary interlocking means connected with one pair of said members and maintaining its operative angular relationship, releasing means securing said secondary interlocking means and connected members to said shafts, and means for locking said secondary means and connected members against motion.

11. In a machine of the character described, a pair of rotating, parallel shafts, two sets of intermeshing gears mounted upon said shafts, two pairs of coöperating blank forming members mounted upon said shafts, means connecting one pair of said members to one set of intermeshing gears, and releasable means normally securing said connected gears and members to their respective shafts.

12. In a machine of the character described, a pair of rotating, parallel shafts, two sets of intermeshing gears mounted upon said shafts, two pairs of coöperating blank forming members mounted upon said shafts, means connecting one pair of said members to one set of intermeshing gears, releasable means normally securing said connected gears and members to their respective shafts, and suitable means for locking said connected gears and members against motion when they are released from said shafts.

13. In a machine of the character described, the combination of two pairs of rotating, parallel shafts, two trains of intermeshing gears mounted upon said shafts, four pairs of blank forming members, two of which are mounted upon each pair of shafts, means connecting one pair of members of each pair of shafts with one train of gears, releasable means securing the connected gears and members to said shafts, and means for locking said connected gears and members against motion.

14. In a machine of the class described, the combination of a pair of shafts, interlocking means operative to maintain said shafts in constant angular relation, a male punch and a female die secured to said respective shafts, a second punch and die pair movable about said shafts, interlocking means operative to maintain said latter punch and die pair in constant angular relation, a second pair of shafts, interlocking means operative to maintain said second shafts in constant angular relation, a set of transverse creasing bars secured to said second shafts, a second set of transverse creasing bars movable about said second shafts, interlocking means operative to maintain said second set of creasing bars in constant angular relation, means operative to maintain a constant angular relationship between the shafts and the first punch and die set carried thereby, and said second set of shafts and the said first set of transverse creasing bars carried thereby, and interlocking means operative to maintain the constant angular relationship between said second punch and die pair and said second set of transverse creasing bars.

15. In a machine of the class described, the combination of a pair of shafts, interlocking means operative to maintain said shafts in constant angular relation, a male punch and a female die secured to said respective shafts, a second punch and die pair movable about said shafts, interlocking means operative to maintain said latter punch and die pair in constant angular relation, a second pair of shafts, interlocking means operative to maintain said second shafts in constant angular relation, a set of transverse creasing bars secured to said second shafts, a second set of tranverse creasing bars movable about said second shafts, interlocking means operative to maintain said second set of creasing bars in constant angular relation, means operative to maintain a constant angular relationship between the shafts and the first punch and die set carried thereby, and said second set of shafts and the said first set of transverse creasing bars carried thereby, interlocking means operative to maintain the constant angular relationship between said second punch and die pair and said second set of transverse creasing bars, and means to normally secure said second punch and die pair and said second set of creasing bars to the respective shafts upon which they are mounted, and to normally maintain said punch and die pairs and said pairs of creasing bars and the shafts upon which each is mounted in constant angular relationship.

In testimony whereof I have affixed my signature.

GEORGE W. SWIFT, Jr.